United States Patent
Dhuse et al.

(10) Patent No.: US 10,339,003 B2
(45) Date of Patent: Jul. 2, 2019

(54) PROCESSING DATA ACCESS TRANSACTIONS IN A DISPERSED STORAGE NETWORK USING SOURCE REVISION INDICATORS

(71) Applicant: International Business Machines Corporation, Armonk, NY (US)

(72) Inventors: Greg R. Dhuse, Chicago, IL (US); Ravi V. Khadiwala, Bartlett, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/611,027

(22) Filed: Jun. 1, 2017

(65) Prior Publication Data

US 2018/0349223 A1    Dec. 6, 2018

(51) Int. Cl.
| | |
|---|---|
| G06F 11/10 | (2006.01) |
| G06F 11/30 | (2006.01) |
| G06F 3/06 | (2006.01) |
| G06F 11/34 | (2006.01) |
| H04L 29/06 | (2006.01) |
| H03M 13/15 | (2006.01) |

(52) U.S. Cl.
CPC ........ *G06F 11/1076* (2013.01); *G06F 3/0604* (2013.01); *G06F 3/067* (2013.01); *G06F 3/0652* (2013.01); *G06F 3/0659* (2013.01); *G06F 11/3006* (2013.01); *G06F 11/3034* (2013.01); *G06F 11/3495* (2013.01); *H03M 13/1515* (2013.01); *H04L 63/101* (2013.01)

(58) Field of Classification Search
USPC ................................ 714/764, 766, 763, 768
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |
| | | (Continued) | |

OTHER PUBLICATIONS

Shamir; How to Share a Secret; Communications of the ACM; vol. 22, No. 11; Nov. 1979; pp. 612-613.
(Continued)

*Primary Examiner* — Fritz Alphonse
(74) *Attorney, Agent, or Firm* — Garlick & Markison; Timothy W. Markison; Timothy D. Taylor

(57) ABSTRACT

A method by a dispersed storage (DS) processing unit of a dispersed storage network (DSN) begins by sending a set of data access requests regarding a data access transaction to a set of storage units of the DSN. The method continues by receiving from each of at least some storage units, a storage-revision indicator which includes a content-revision field, a delete-counter field, and a contest-counter field. The method continues by generating an anticipated storage-revision indicator based on a current revision level of the set of encoded data slices and based on a data access type of the data access transaction. The method continues by comparing the anticipated storage-revision indicator with the storage-revision indicators. When a threshold number of the storage-revision indicators received from the at least some storage units substantially match the anticipated storage-revision indicator, the method continues by executing the data access transaction.

14 Claims, 9 Drawing Sheets

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,448,044 B2 | 5/2013 | Dhuse et al. | |
| 8,819,179 B2 | 8/2014 | Resch et al. | |
| 8,856,552 B2 | 10/2014 | Dhuse et al. | |
| 8,874,991 B2 | 10/2014 | Resch | |
| 8,880,799 B2 | 11/2014 | Foster et al. | |
| 9,380,032 B2 | 6/2016 | Resch et al. | |
| 9,501,355 B2 | 11/2016 | Resch et al. | |
| 9,563,507 B2 | 2/2017 | Dhuse et al. | |
| 9,576,018 B2 | 2/2017 | Resch | |
| 9,658,911 B2 | 5/2017 | Resch et al. | |
| 9,727,275 B2 | 8/2017 | Kazi | |
| 9,823,845 B2 | 11/2017 | Abhijeet et al. | |
| 9,875,158 B2 | 1/2018 | Abhijeet et al. | |
| 9,880,902 B2 | 1/2018 | Baptist et al. | |
| 9,894,151 B2 | 2/2018 | Dhuse et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0261813 A1 | 10/2011 | Baptist et al. | |
| 2013/0282865 A1* | 10/2013 | Baptist | H04L 67/16 709/217 |
| 2014/0244788 A1* | 8/2014 | Resch | H04L 67/1097 709/217 |
| 2014/0351457 A1 | 11/2014 | Baptist et al. | |
| 2016/0117336 A1 | 4/2016 | Aron et al. | |
| 2017/0192684 A1* | 7/2017 | Grube | H04L 67/1097 |
| 2017/0192705 A1* | 7/2017 | Grube | G06F 3/0619 |
| 2018/0067820 A1* | 3/2018 | Dhuse | H04L 63/08 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
List of IBM Patents or Applications Treated as Related, Jun. 1, 2017, 2 pages.
Transactional Memory: Architectural Support for Lock-free Data Structures; Herlihy et al; Proceedings of the 20th Annual International Symposium on Computer Architecture; May 16-19, 1993; pp. 289-300 (12 pages) (Year: 1993).
"Resch et al,""AONT-RS: Blending Security and Performance in Dispersed Storage Systems""", 2011 FAST'11 USENIX conference,retrieved at: https://www.usenix.org/legacy/event/fast11/tech/full_papers/Resch.pdf (Year: 2011)".

* cited by examiner distributed, or dispersed, storage network (DSN) 10

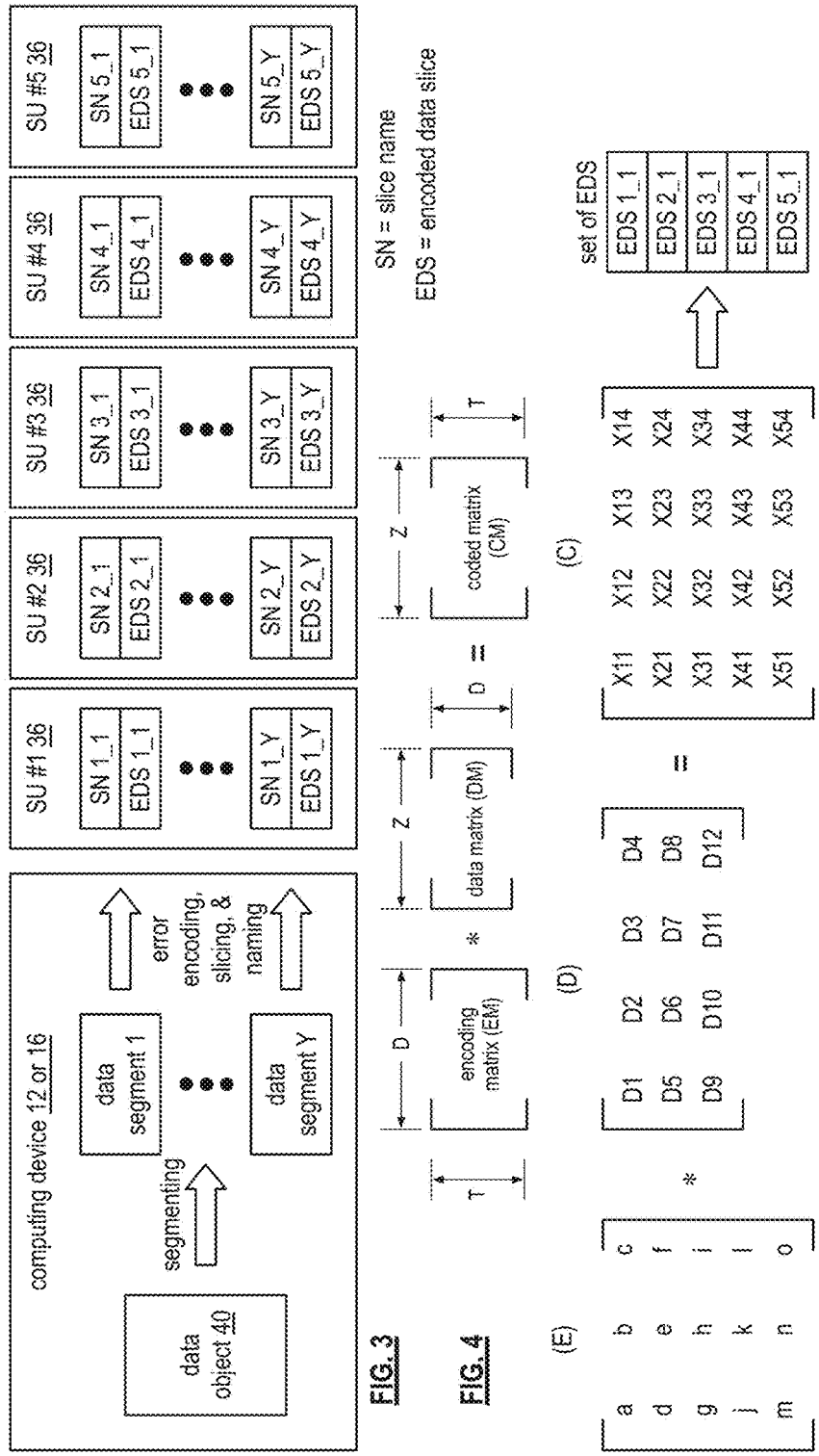

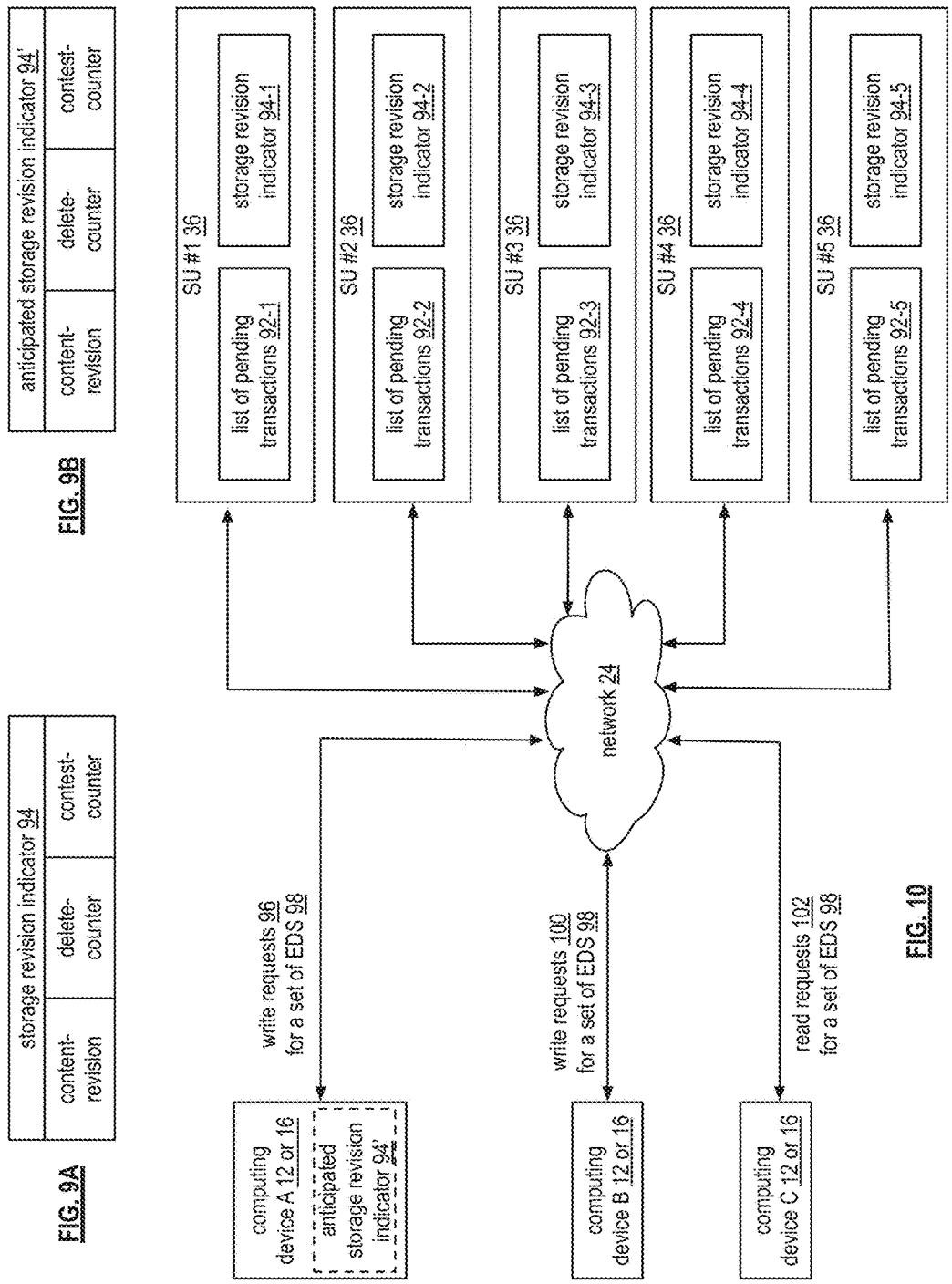

| write request 96 or 100 | | | |
|---|---|---|---|
| transaction # | SN | EDS | current rev. | new rev. |

FIG. 11

SN = slice name
EDS = encoded data slice

| write request 96-1 | | | |
|---|---|---|---|
| 0413 | SN 1_1 | EDS A_1_1 | 003 | 004 |

• • •

| write request 96-5 | | | |
|---|---|---|---|
| 0413 | SN 5_1 | EDS A_5_1 | 003 | 004 |

↑ computing device A 12 or 16 write requests 96 for a set of EDS 98

| write request 100-1 | | | |
|---|---|---|---|
| 0279 | SN 1_1 | EDS B_1_1 | 003 | 004 |

• • •

| write request 100-5 | | | |
|---|---|---|---|
| 0279 | SN 5_1 | EDS B_5_1 | 003 | 004 |

↑ computing device B 12 or 16 write requests 100 for a set of EDS 98

| read request 102-1 | | |
|---|---|---|
| 0338 | SN 1_1 | 003 |

• • •

| read request 102-5 | | |
|---|---|---|
| 0338 | SN 5_1 | 003 |

↑ computing device C 12 or 16 read requests 102 for a set of EDS 98

FIG. 13

| read request 102 | | |
|---|---|---|
| transaction # | SN | current rev. |

FIG. 12

PROCESSING DATA ACCESS TRANSACTIONS IN A DISPERSED STORAGE NETWORK USING SOURCE REVISION INDICATORS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems often utilize a three-phase process for writing consistently in a dispersed storage network (DSN) memory, where the three phases include: (1) A write phase; (2) A commit phase; and (3) A finalize phase. The three phases address consistency issues that may arise from different storage units of the DSN holding different revisions of encoded data slices, where data is dispersed storage error encoded to produce the encoded data slices. The three phases are known to utilize a threshold approach to advance the writing process to the next phase or to reverse the process when conflicts and errors arise to maintain consistency of revision storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIGS. 9A and 9B are schematic block diagrams of examples of a storage revision indicator and an anticipated storage revision indicator in accordance with the present invention;

FIG. 10 is a schematic block diagram of an example of overlapping write requests and read requests for a set of encoded data slices in accordance with the present invention;

FIG. 11 is a schematic block diagram of an example of a write request in accordance with the present invention;

FIG. 12 is a schematic block diagram of an example of a read request in accordance with the present invention;

FIG. 13 is a schematic block diagram of another example of overlapping write requests and read requests for a set of encoded data slices in accordance with the present invention;

DETAILED DESCRIPTION OF THE INVENTION

Figure 1:
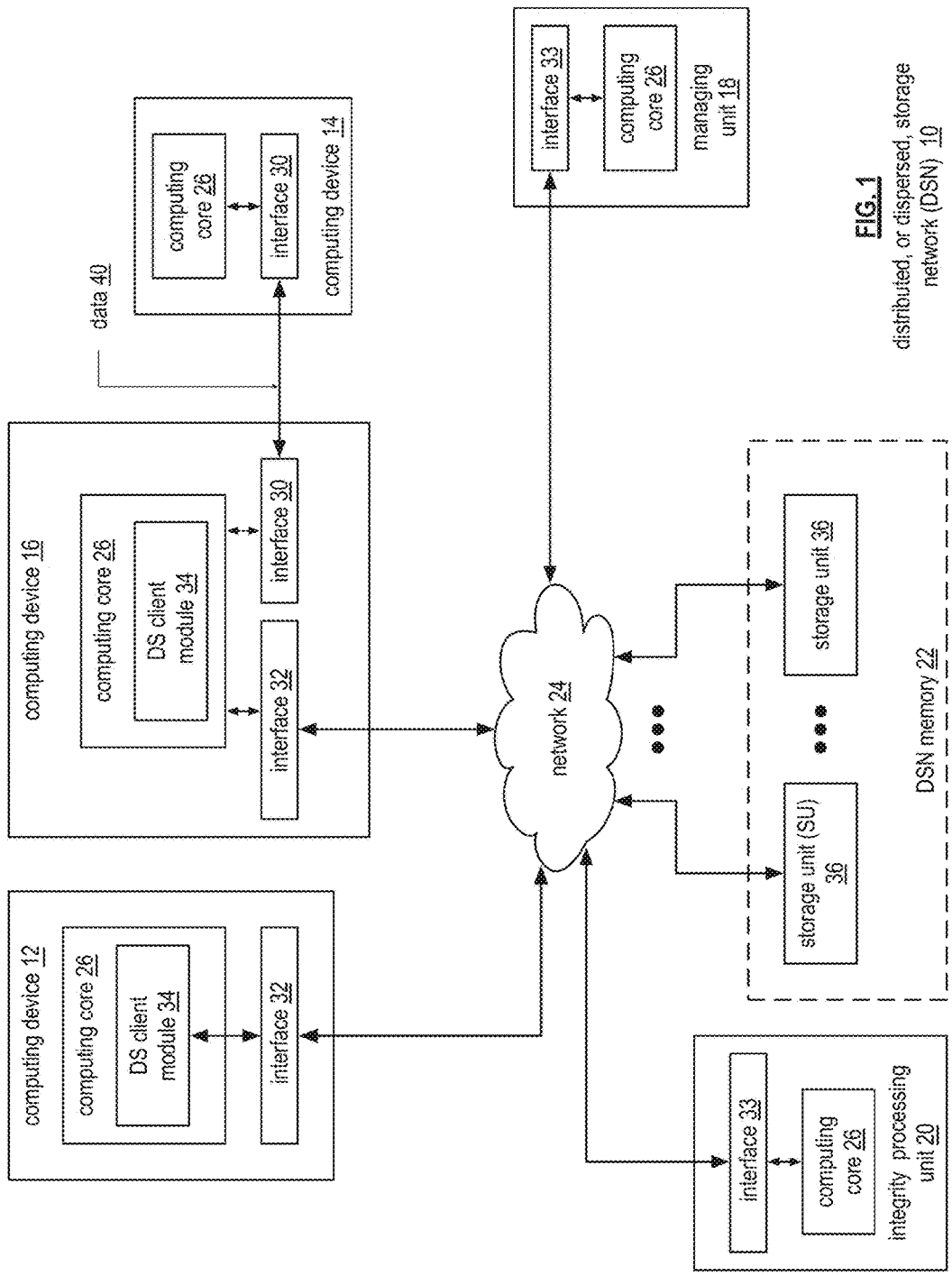
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
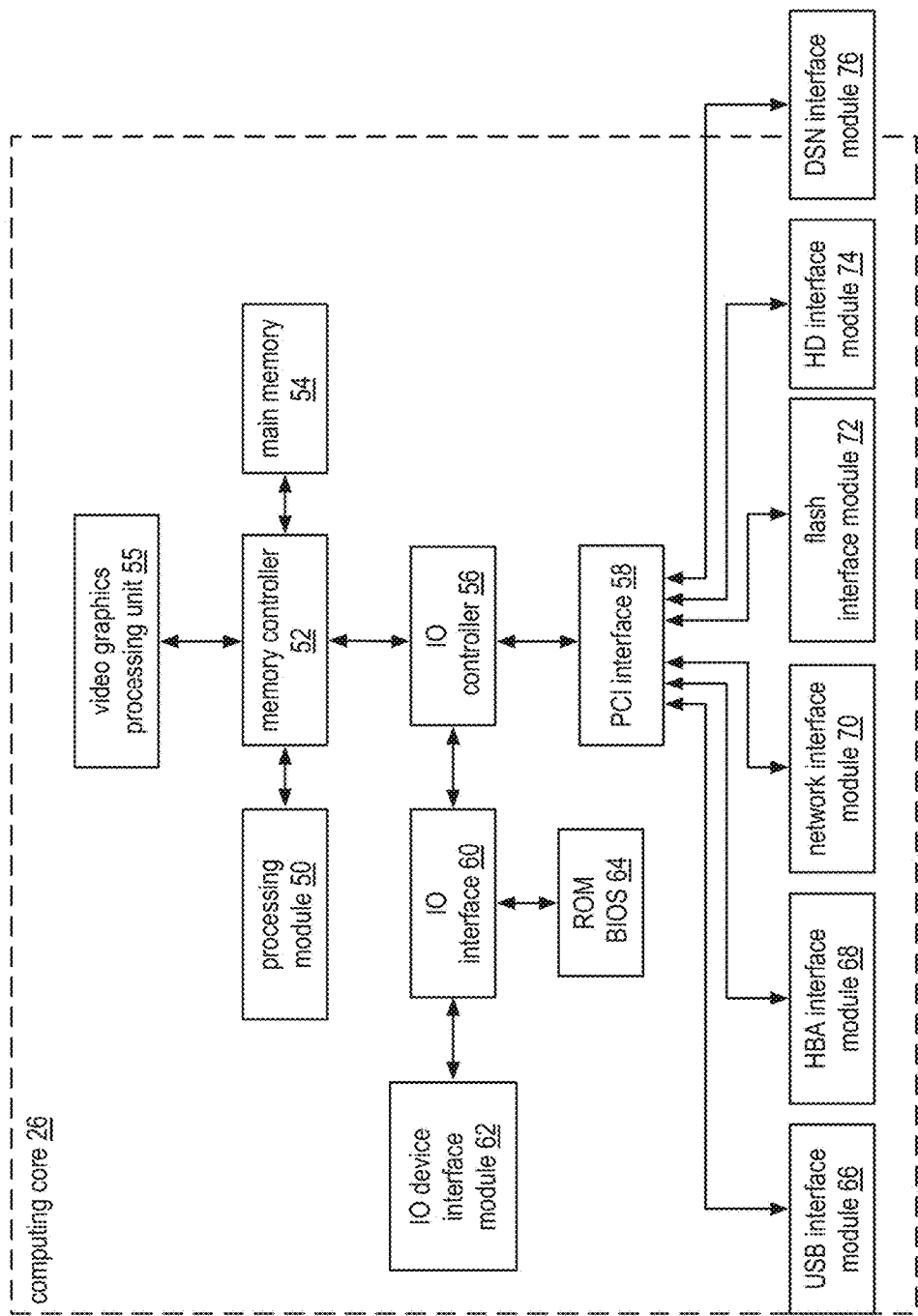
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM).

The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
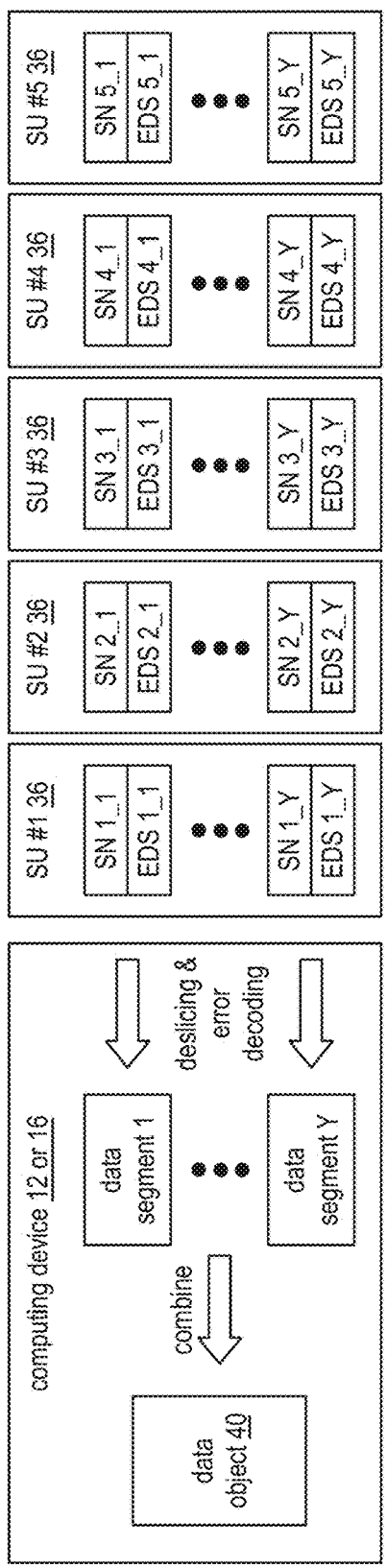
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
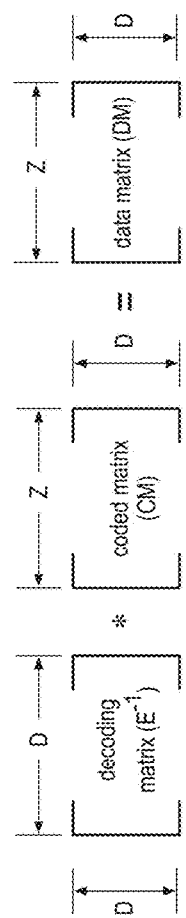
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIGS. 9A and 9B are schematic block diagrams of examples of a storage revision indicator 94 and an anticipated storage revision indicator 94', which support correct data access transaction behavior for an encoded data slice(s).

Both the storage revision indicator 94 and the anticipated storage revision indicator 94' include a content revision field, a delete counter field and a contest counter field. The content revision field contains information that uniquely identifies the content of an encoded data slice (e.g., hash thereof, revision level, etc.). The delete counter field contains information that indicates a number of times the encoded data slice has been deleted. The contest counter field contains information that indicates a number of contests the encoded data slice has participated in. As discussed below, the storage revision indicator 94 supports resolution of data access contention of data stored or to be stored in the DSN.

FIG. 10 is a schematic block diagram of an example of overlapping write requests 96, 100 and read requests 102 for a set of encoded data slices in a dispersed storage network (DSN). The DSN includes computing devices A, B and C 12 or 16, the network 24 of FIG. 1, and a set of storage units 36. The computing devices 12 or 16 may be implemented by a dispersed storage (DS) processing unit. For example, computing device A may be implemented by a DS processing unit #1, computing device B may be implemented by a DS processing unit #2, computing device C may be implemented by a DS processing unit #3. Each storage unit of the set of storage units 36 includes one or both of a list of pending transactions 92 (e.g., list of pending transactions 92-1 through 92-5) and a storage revision indicator 94 (e.g., storage revision indicators 94-1 through 94-5). Each computing device may generate and store a set of anticipated storage revision indicators 94-1'-94-5' related to a data access transaction (e.g., a write request 96 or 100).

In an example of operation, conflicting write requests are sent to the storage units 36 for a set of encoded data slices 98 having the same set of slice names. Conflicting write requests occur when two or more DS processing units issue write requests for the same set of encoded data slices at substantially the same time. In this situation, latency of communication between the DS processing unit and the storage units is a contributing factor in determining, which, if any, of the DS processing units "win" the conflict.

As a specific example, computing devices A and B (e.g., computing device 12 or 16 of FIG. 1) issue conflicting write requests regarding a set of encoded data slices with the same set of slices names to the storage units (SU 1-5). As shown in FIG. 11, a write request includes a transaction number field, a slice name (SN) field, an encoded data slice (EDS) field, a current revision level field, and a new revision level field. Each write request in the set of write requests includes the same transaction number, a different slice name, a different EDS, the same current revision level, and the same new revision level.

Returning to the discussion of FIG. 10, computing device C issues a conflicting read request for the same set of encoded data slices (e.g., issued at substantially the same time as the write requests from computing devices A and B). As shown in FIG. 12, a read request 102 includes a transaction number field, a slice name (SN) field, and a current revision level field. Each read request in the set of read requests 102 includes the same transaction number, a different slice name, and the same current revision level.

FIG. 13 further illustrates the content of the conflicting sets of write requests and the set of read requests for a set of encoded data slices having the same set of slice names and current revision level. In this example, each of computing devices A and B disperse storage error encode a data segment into a set of five encoded data slices and generates five write requests 96-1 through 96-5 and 100-1 through 100-5, respectively. The write requests from computing device A include the same transaction number of 0413 (which may be randomly generated, may be a time stamp, etc.), slice names (SN 1_1 through SN 5_1), encoded data slices (EDS A_1_1 through EDS A_5_1), the same current revision level of 003, and the same next revision level of 004.

The write requests form computing device B include the same transaction number of 0279, slice names (SN 1_1 through SN 5_1), encoded data slices (EDS B_1_1 through EDS B_5_1), the same current revision level of 003, and the same next revision level of 004. A comparison of the write requests from computing device A with the write requests from computing device B yields that the write requests have the same slice names, the same current revision levels, and the same next revision levels. The write requests differ in the transaction numbers and in the encoded data slices. In addition, computing device C issues five read requests 102-1 through 102-5 for the set of encoded data slices 98. The read requests include the same transaction number of 0338, different slice names (SN 1_1 through SN 5_1), and the current revision level of 003.

Returning to the discussion of FIG. 10, as each storage unit receives its respective write requests (e.g., one from each of computing devices A and B), it generates and stores one or both of a list of pending transactions 92 (e.g., 92-1 by SU #1) and a storage revision indicator 94 (e.g., 94-5 by SU #5). The list of pending transactions 92 include a time ordered list of transaction numbers, or other indication, associated with data access requests regarding the slice names that were received for the conflicting write requests. The storage revision indicators 94 include a content revision field, a delete counter field, and a contest counter field.

As a specific example, a first write request from computing device A regarding a version of an encoded data slice having the first slice name has a first transaction number (e.g., 0413) and a second write request from computing device B regarding another version of the encoded data slice having the first slice name has a second transaction number (e.g., 0279). Storage unit #1 received the first write request before receiving the second write request, as such the first write request (e.g., the first transaction number) in a first priority position and the second write request in a second priority position.

As another specific example, a write request from computing device A regarding a version of an encoded data slice having a second slice name has the first transaction number (e.g., 0413) and a write request from computing device B regarding another version of the encoded data slice having the second slice name has the second transaction number (e.g., 0279). Storage unit #2 received the write request from computing device B before receiving the write request from computing device A. As such, the write request of computing device B (e.g., the second transaction number) in the first priority position and the write request from computing device A in a second priority position. The remaining storage units generate their respective list of pending transactions in a similar manner.

After generating the list of pending transactions 92 and the storage revision indicators 94, the storage units send back write responses to the respective computing devices 12 or 16. The computing device interprets the write responses to determine whether a threshold number, or more, (e.g., decode threshold number, write threshold number, etc.) of its write requests is in the first priority position or its storage revision indicators match anticipated storage revision indicators. When there is not an overlapping write request, the write requests will be in the first priority position and the storage revision indicator will match anticipated storage revision indicators. As such, the computing device sends finalize requests to the storage units.

The storage units process the finalize request to make the new version of the encoded data slices as the most recent set of encoded data slices. When there is an overlapping write request, the write requests will be in the second priority position and the storage revision indicators will not match anticipated storage revision indicators. As such, the computing device may issue a rollback request. As the computing devices receive the list of pending transactions and storage revision indicators, it determines whether at least the threshold number of their respective write requests are in first priority position or whether the storage revision indicators match anticipated storage revision indicators. If yes, the computing device issues the finalize commands. If not, the computing device withdraws it write requests or executes some other fallback position.

As another specific example, computing device A and B 12 or 16 send overlapping write requests 96 and 100 to the set of storage units 36. Storage units 1, 3, 4 and 5 receive write requests 96 first and storage unit 2 receives write request 100 first. When determining how to properly process overlapping write requests using storage revision indicators 94, the computing device A receives write responses from the set of storage units 36, which include storage revision indicators 94. The computing device A then compares the received storage revision indicators with anticipated storage revision indicators. In this example, the computing device A determines that for storage unit #1, the storage revision indicator (e.g., the content revision field=rev. Y+1, a hash of the encoded data slice=a55b82, etc.) substantially matches an anticipated storage revision indicator (e.g., the content revision field=rev. Y+1, a hash of the encoded data slice=a55b82, etc.). The computing device A processes write responses from storage units 3-5 in similar manner to processing write responses from storage unit 1.

For storage unit #2, the computing device A determines that the storage revision indicator (e.g., the content revision field=rev. Y+2, a hash of the encoded data slice=bb5x8c, etc.) does not substantially match an anticipated storage revision indicator (e.g., the content revision field=rev. Y+1, a hash of the encoded data slice=a55b82, etc.). The content revision field of the storage revision indicator received from storage unit #2 does not match the content revision field of the anticipated storage revision indicator due to the write request 100 from computing device B being processed before the write request 96 from computing device A. As such, the computing device A may issue to storage unit #2 a rollback request, may withdraw its write request or may execute some other fallback position. Computing device B also determines how to properly process the overlapping write requests using storage revision indicators 94 in similar manner to computing device A.

In addition to the two write requests, computing device C is sending read requests to the storage units for the set of encoded data slices 98. The storage units add the read requests to their respective list of pending transactions and sends the updated list of pending transactions to computing device C. Upon receiving the list of pending transactions, computing device C determines whether to proceed with the read request (e.g., read the current revision level of the set of encoded data slices) or terminate the read request. As an alternative, computing device C processes the list of pending transactions to determine that the new set of encoded data slices from computing device A or computing device B will be the next current version of the set of encoded data slices. Having made this determination, computing device C modifies its read requests to read the next current version of the set of encoded data slices.

Note the dispersed storage network may also include a priority protocol, which determines which one of and how overlapping data access transactions are to be processed. For example, in a write-delete conflict, the priority protocol may indicate that the delete request overrides the write request. As another example, the priority protocol may indicate that a write request from a higher ranked entity overrides a delete request from a lower ranked entity. As a yet further example, the priority protocol may indicate that when neither conflicting write request has a threshold number of favorable storage revision indicator matches, that both write requests should not be processed, or alternatively, only one of the write requests should be re-tried. Alternatively, the priority protocol may indicate that the computing device with more successful higher priority requests override a number of the other computing devices' successful lower priority requests. Note the number may be a difference between the number of successful higher priority requests and the threshold number.

Figure 14:
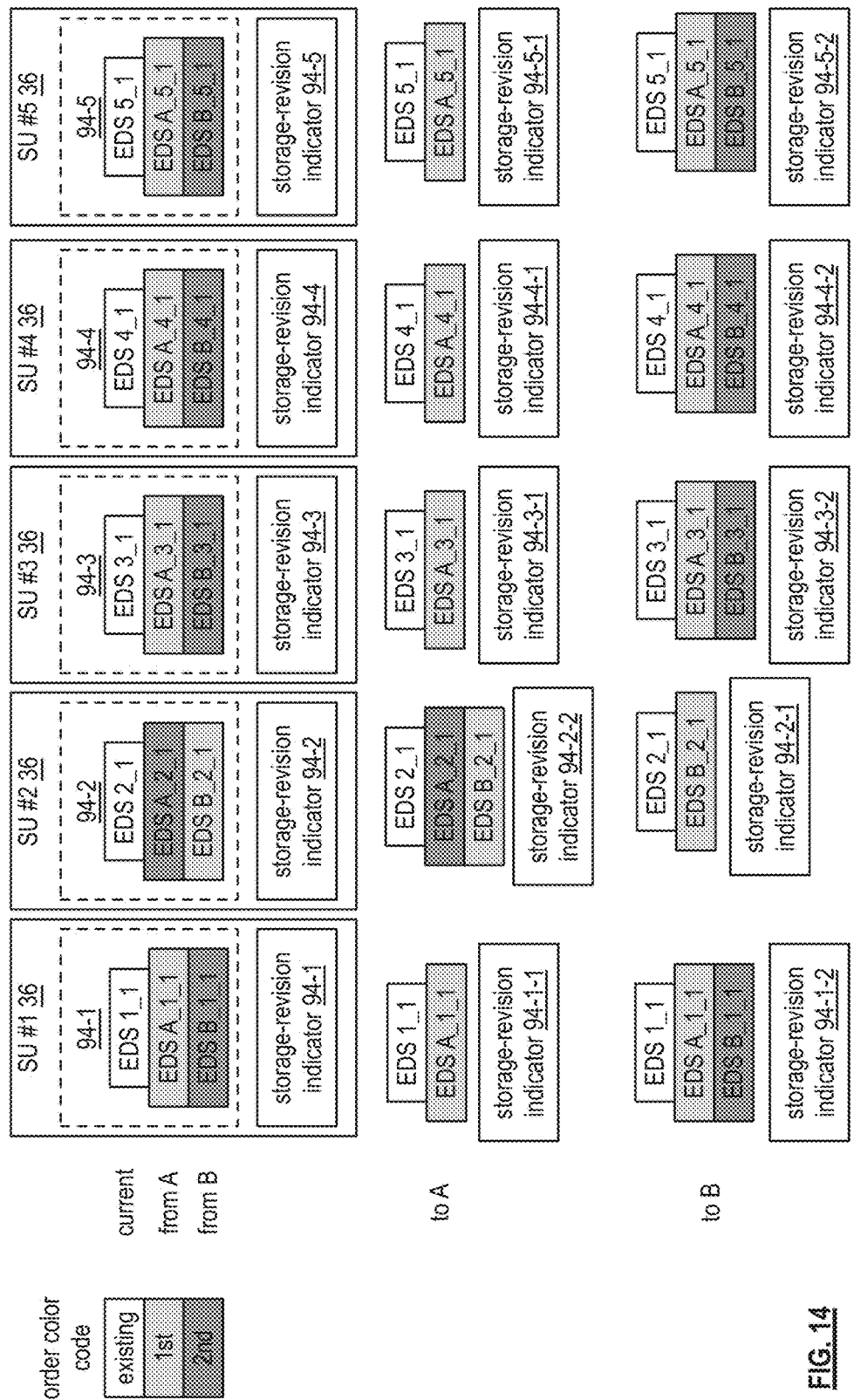
FIG. 14 is a schematic block diagram of another example of overlapping write requests for a set of encoded data slices in accordance with the present invention.

FIG. 14 is a schematic block diagram of another example of overlapping write requests for a set of encoded data slices. In this example, while the write requests 96 and 100 and the read requests 102 are sent out at similar times, due to differing latencies and/or processing capabilities between the computing devices and storage units, the requests are received at different times and, potentially in a different order, by the storage units than the order in which they were transmitted.

Prior to the reception of any of the read or write requests, the storage units store a current revision level of the set of encoded data slices. As shown, storage unit SU#1 stores EDS 1_1, storage unit SU#2 stores EDS 2_1, and so on. In this example, the current revision level of the encoded data slices is 003. In addition, each of the storage units include a storage revision indicator for their respective encoded data slice.

In this example, when a storage unit receives a data access request, the storage unit accesses the storage revision indicator regarding the data access transaction it just received, updates information within the storage revision indicator based on the type of data access transaction, and sends the updated storage revision indicator to the computing device from which it received the request.

For example, each of storage units 1, 3, 4, and 5 received the write request from computing device A first. Accordingly, each storage unit 1-5 updates its storage revision indicators (e.g., 94-1-1, 94-2-2, 94-3-1, 94-4-1, and 94-5-1) for write requests from computing device A, which are then sent as write responses back to computing device A. Continuing with the example, storage unit #2 receives the write request from computing device B first. Accordingly, each storage unit 1-5 updates its storage revision indicator (e.g., 94-1-2, 94-2-2, 94-3-2, 94-4-2, and 94-5-2) for write requests from computing device B, which are then sent as write responses to computing device B.

After receiving the write responses from the storage units, the computing devices compare each storage revision indicator with each respective storage revision indicator. The computing devices A and B process the data access transactions as previously discussed and/or as described with reference to FIGS. 15 and 16.

Figure 15:
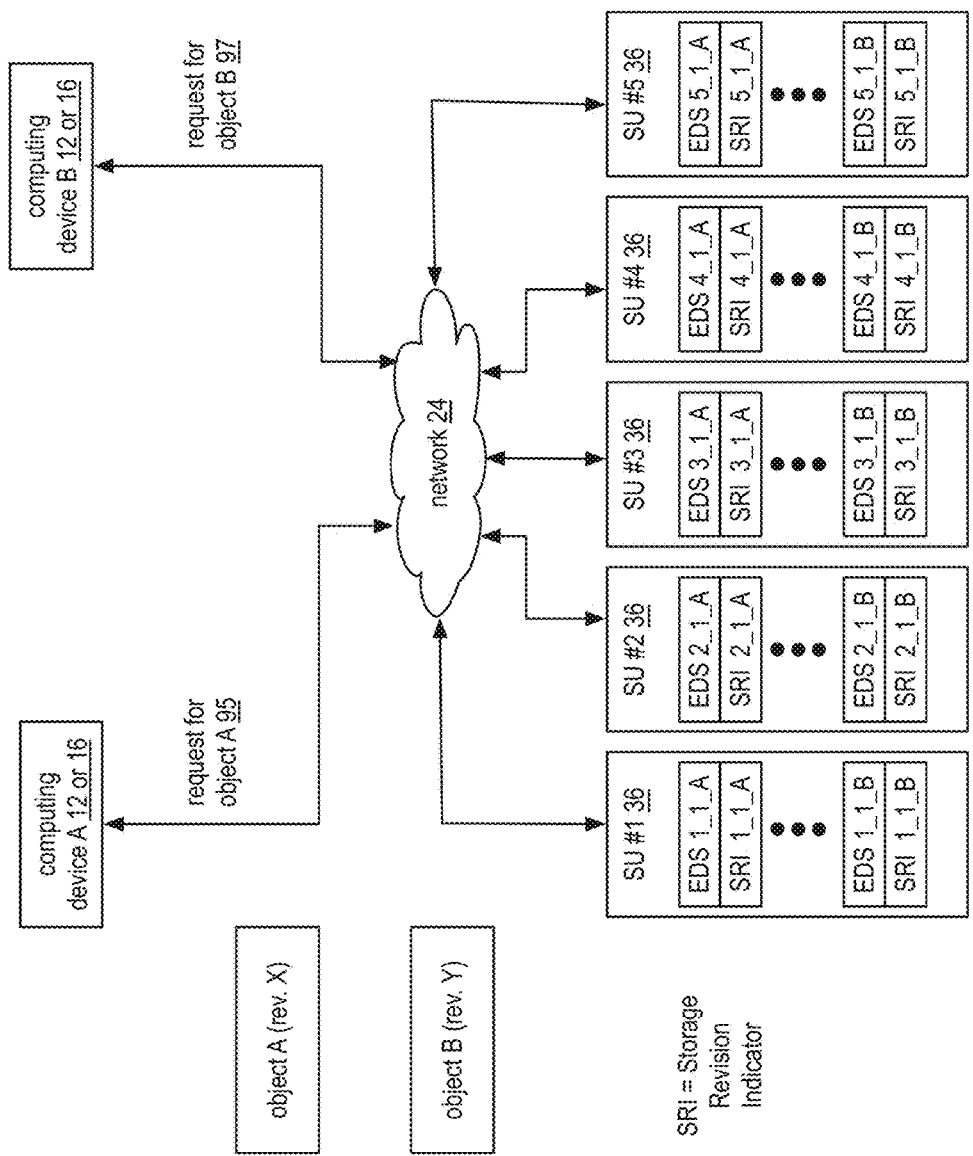
FIG. 15 is a schematic block diagram of overlapping data access transactions in a dispersed storage network (DSN). in accordance with the present invention.

FIG. 15 is a schematic block diagram of overlapping data access transactions in a dispersed storage network (DSN). The DSN includes computing devices 12 or 16, the network 24 of FIG. 1, and a set of storage units 36. The storage units store object A (rev. x) as encoded data slices (e.g., EDS 1_1_A through 5_1_A) and storage object B (rev. Y) as encoded data slices (e.g., EDS 1_1_B through 5_1_B). The set of storage units also store revision indicators (SRIs) SRI 1_1_A-SRI 5_1_A which correspond to encoded data slices EDS 1_1_A through 5_1_A and store revision indicators (SRIs) SRI 1_1_B-SRI 5_1_B which correspond to encoded data slices EDS 1_1_B through 5_1_B.

In an example of operation, computing device B 12 or 16 sends a data access request (e.g., an ensure operation) for object B 97 to the set of storage units #1-#5 36. An ensure operation is a data access transaction that guarantees one or more of a transaction's data match a specific revision, but does not update the checked data to a new revision. For example, an ensure operation for the update of object B (e.g., request for object B 97) is only valid if data object A has not been changed from a previously read revision (e.g., rev. X).

The storage units access the storage revision indicators for data object B (e.g., SRI 1_1_B-SRI 5_1_B) and the storage revision indicators for data object A (e.g., SRI 1_1_A-SRI 5_1_A), update the storage revision indicators 94 and send the updated storage revision indicators as write responses to computing device B 12 or 16. The computing device B 12 or 16 compares the received storage revision indicators to anticipated storage revision indicators 94' (e.g., the anticipated storage revision indicators 94' of FIG. 9B). For example, the computing device B 12 or 16 compares storage revision indicators 94 (SRI 1_1_B through SRI 5_1_B) to anticipated storage revision indicators 94' for EDSs 1_1_B through EDS 5_1_B and compares SRI 1_1_A through SRI 5_1_A to anticipated storage revision indicators for EDSs 1_1_A through EDS 5_1_A.

For an ensure operation, all received storage indicators for the data object being checked against (e.g., data object A) must match anticipated storage indicators for data object A (SRI 1_1_A through SRI 5_1_A), as the data access request for data object B is only valid if data object A has not been changed from a previously read revision. When the operation is not valid (e.g., one or more SRIs does not substantially match respective anticipated SRIs), the computing device B 12 or 16 may void the request, or retry the request in accordance with a retry protocol.

When the operation is valid, the computing device B determines whether at least a threshold number (e.g., a decode threshold, a read threshold, a write threshold, a pillar width number, or some other level between the decode threshold and the pillar width number) of received storage revision indicators substantially match anticipated storage revision indicators for EDSs 1_1_B through 5_1_B. When at least a threshold number of received storage revision indicators SRI 1_1_B-SRI 5_1_B substantially match respective anticipated storage revision indicators, the computing device B executes the ensure operation (e.g., by sending finalize write requests to the set of storage units) to update data object B (e.g., update EDS 1_1_B through 5_1_B to a next revision (e.g., rev. Y+1).

In another example of operation, a data access request (e.g., an ensure operation) for object B 97 overlaps a data access request (e.g., a delete request, a write request) for object A 95. In this example, computing device A determines there is an overlapping request when a contest counter field of one or more of the storage revision indicators does not match the contest counter field of a respective anticipated storage revision indicator, due to the ensure operation from computing device B incrementing it. Computing device B determines there is an overlapping request when the content revision of a storage revision indicator (SRI 1_1_A-SRI 5_1_A) does not match an anticipated storage revision indicator relating to EDS 1_1_A-EDS 5_1_A. For example, storage revision indicator SRI 2_1_A includes rev. Y+1 in the content revision field and the anticipated storage revision indicator for EDS 2_1_A includes rev. Y in the content revision field (due to storage unit 2 receiving request for object B 97 after receiving request for object A 95). The computing device A or B may then process the overlapping write requests in similar manner discussed above or as discussed in FIG. 16. For example, the computing devices A and B 12 or 16 may access a priority protocol to determine how to process the overlapping write requests 96 and 100 (i.e., the priority protocol may indicate that the ensure operation overrides the write operation).

Figure 16:
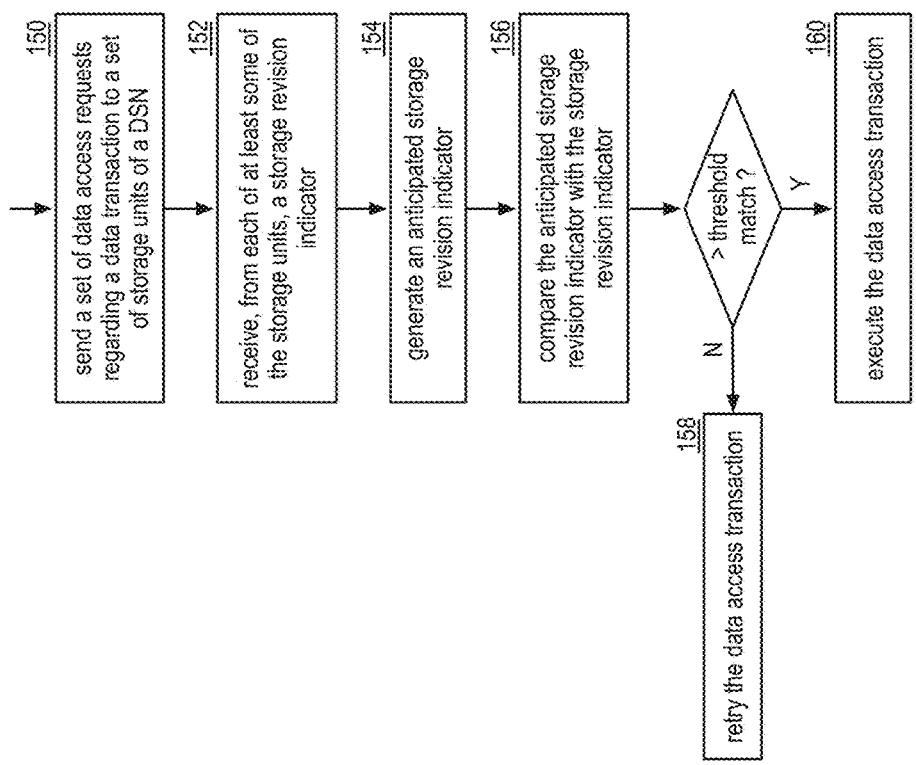
FIG. 16 is a logic flow diagram of an example of resolving overlapping data access transactions, in accordance with the present invention.

FIG. 16 is a logic flow diagram of an example of resolving overlapping data access transactions. The method beings at step 150, where a computing device of a dispersed storage network (DSN) sends a set of data access requests regarding a data access transaction involving a set of encoded data slices that is stored or is to be stored to a set of storage units of the DSN. Note a data segment of a data object is dispersed storage error encoded into the set of encoded data slices. Further note the data access transaction includes one of a write operation, a delete operation, and an ensure operation.

The method continues at step 152, where the computing device receives from each of at least some storage units of the set of storage units, a storage-revision indicator. The storage-revision indicator includes a content-revision field, a delete-counter field, and a contest-counter field. The content-revision uniquely identifies content of an encoded data slice of the set of encoded data slices, the delete-counter indicates a number of times the encoded data slice has been deleted, and the contest-counter indicates a number of data access contests the encoded data slice has participated in.

The method continues at step 154, where the computing device generates an anticipated storage-revision indicator for the data access transaction based on a current revision level of the set of encoded data slices and based on a data access type of the data access transaction. The method continues at step 156, where the computing device compares the anticipated storage-revision indicator with the storage-revision indicators received from the at least some storage units.

In an example of operation, the computing device (e.g., a DS processing unit) sends a set of data access requests regarding a data access transaction. During the data access transaction (e.g., a write operation, delete operation, ensure operation, etc.), the computing device generates an anticipated storage revision indicator. The computing device generates the anticipated storage revision indicator by one or more of performing a look up (e.g., accessing a table), by receiving a current storage revision indicator 94, etc., and then by modifying information within the fields of the current storage revision indicator 94 based on the data access transaction. The anticipated storage revision indicator includes the same fields as the storage revision indicator, but contains modified (e.g., expected) information in the fields based on the type of operation (e.g., data access transaction). For example, a write operation changes the content revision field (e.g., update from ver. 1 to ver. 2, hash from 84hhj to 3sx9j, etc.), leaves the delete counter unchanged and resets the contest counter to zero. A delete operation changes the content revision field to 'null', increments information in the delete counter field, and resets the contest counter field to zero. An ensure operation, leaves information the content revision field unchanged, leaves information in the delete counter unchanged, and increments the contest counter.

When a threshold number of the storage-revision indicators received from the at least some storage units does not substantially match the anticipated storage-revision indicator, the method continues at step 158, where the computing device by the DS processing unit, the data access transaction in accordance with a retry protocol. The retry protocol may raise priority of the data access transaction, the longer the wait is to retry, based on the number of retries, and in accordance with timeframe.

For example, the computing device receives storage revision indicators 94 from each of the storage units and compares the anticipated storage revision indicator with each storage revision indicator 94. When the computing device determines that a threshold number of the storage revision indicators received from the at least some storage units substantially match the anticipated storage revision indicator, the computing device executes the data access transaction. When the computing device determines that a threshold number of the storage revision indicators received from the at least some storage units does not substantially match the anticipated storage revision indicator, the computing device re-tries the data access transaction in accordance with a retry protocol (e.g., a longer wait or more re-tries indicates higher a priority, certain number of retries, etc.).

When a threshold number of the storage-revision indicators received from the at least some storage units substantially match the anticipated storage-revision indicator, the method continues at step 160, where the computing device executes the data access transaction.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
sending, by a dispersed storage (DS) processing unit of a dispersed storage network (DSN), a set of data access requests to a set of storage units of the DSN, wherein the set of data access requests is regarding a data access transaction involving a set of encoded data slices, wherein a data segment of a data object is dispersed storage error encoded into the set of encoded data slices, and wherein the set of storage units stores, or is to store, the set of encoded data slices;
receiving, by the DS processing unit from each of at least some storage units of the set of storage units, a storage-revision indicator, wherein the storage-revision indicator includes a content-revision field, a delete-counter field, and a contest-counter field, wherein the content-revision uniquely identifies content of an encoded data slice of the set of encoded data slices, wherein the delete-counter indicates a number of times the encoded data slice has been deleted, and wherein the contest-counter indicates a number of data access contests the encoded data slice has participated in;
generating, by the DS processing unit, an anticipated storage-revision indicator for the data access transaction based on a current revision level of the set of encoded data slices and based on a data access type of the data access transaction;
comparing, by the DS processing unit, the anticipated storage-revision indicator with the storage-revision indicators received from the at least some storage units; and
when a threshold number of the storage-revision indicators received from the at least some storage units substantially match the anticipated storage-revision indicator, executing, by the DS processing unit, the data access transaction.

2. The method of claim 1 further comprises:
when a threshold number of the storage-revision indicators received from the at least some storage units does not substantially match the anticipated storage-revision indicator, re-trying, by the DS processing unit, the data access transaction in accordance with a retry protocol.

3. The method of claim 1, wherein the data access transaction comprises one of:
a write operation;
a delete operation; and
an ensure operation.

4. The method of claim 1, wherein an ensure operation comprises:
verifying a revision level of a second data object prior to executing the data access transaction.

5. The method of claim 1 further comprises:
when the data access transaction is a write operation, generating the anticipated storage-revision indicator by:

changing information in the content-revision field;
leaving, unchanged, information in the delete-counter field; and
resetting the contest counter field to zero.

6. The method of claim 1 further comprises:
when the data access transaction is a delete operation, generating the anticipated storage-revision indicator by:
resetting information in the content-revision field to null;
incrementing information in the delete-counter field; and
resetting the contest counter field to zero.

7. The method of claim 1 further comprises:
when the data access transaction is an ensure operation, generating the anticipated storage-revision indicator by:
leaving, unchanged, information in the content-revision field;
leaving, unchanged, information in the delete-counter field; and
incrementing information in the contest counter field.

8. A dispersed storage (DS) processing unit of a dispersed storage network (DSN), comprises:
memory;
an interface; and
a processing module operably coupled to the memory and the interface, wherein the processing module is operable to:
send a set of data access requests to a set of storage units of the DSN, wherein the set of data access requests is regarding a data access transaction involving a set of encoded data slices, wherein a data segment of a data object is dispersed storage error encoded into the set of encoded data slices, and wherein the set of storage units stores, or is to store, the set of encoded data slices;
receive from each of at least some storage units of the set of storage units, a storage-revision indicator, wherein the storage-revision indicator includes a content-revision field, a delete-counter field, and a contest-counter field, wherein the content-revision uniquely identifies content of an encoded data slice of the set of encoded data slices, wherein the delete-counter indicates a number of times the encoded data slice has been deleted, and wherein the contest-counter indicates a number of data access contests the encoded data slice has participated in;
generate an anticipated storage-revision indicator for the data access transaction based on a current revision level of the set of encoded data slices and based on a data access type of the data access transaction;

compare the anticipated storage-revision indicator with the storage-revision indicators received from the at least some storage units; and
when a threshold number of the storage-revision indicators received from the at least some storage units substantially match the anticipated storage-revision indicator, execute the data access transaction.

9. The DS processing unit of claim 8, wherein the processing module is further operable to:
when a threshold number of the storage-revision indicators received from the at least some storage units does not substantially match the anticipated storage-revision indicator, re-try, by the DS processing unit, the data access transaction in accordance with a retry protocol.

10. The DS processing unit of claim 8, wherein the data access transaction comprises one of:
a write operation;
a delete operation; and
an ensure operation.

11. The DS processing unit of claim 8, wherein the processing module is further operable to perform an ensure operation by:
verifying a revision level of a second data object prior to executing the data access transaction.

12. The DS processing unit of claim 8, wherein the processing module is further operable to:
when the data access transaction is a write operation, generate the anticipated storage-revision indicator by:
changing information in the content-revision field;
leaving, unchanged, information in the delete-counter field; and
resetting the contest counter field to zero.

13. The DS processing unit of claim 8, wherein the processing module is further operable to:
when the data access transaction is a delete operation, generate the anticipated storage-revision indicator by:
resetting information in the content-revision field to null;
incrementing information in the delete-counter field; and
resetting the contest counter field to zero.

14. The DS processing unit of claim 8, wherein the processing module is further operable to:
when the data access transaction is an ensure operation, generate the anticipated storage-revision indicator by:
leaving, unchanged, information in the content-revision field;
leaving, unchanged, information in the delete-counter field; and
incrementing information in the contest counter field.

* * * * *